(12) United States Patent
Verdino

(10) Patent No.: US 9,518,870 B2
(45) Date of Patent: Dec. 13, 2016

(54) WIRELESS TEMPERATURE SENSOR FOR CONCRETE DELIVERY VEHICLE

(75) Inventor: Steve Verdino, Hamilton, OH (US)

(73) Assignee: Verifi LLC, West Chester, OH (US)

( * ) Notice: Subject to any disclaimer, the term of this patent is extended or adjusted under 35 U.S.C. 154(b) by 586 days.

(21) Appl. No.: 13/818,046

(22) PCT Filed: Aug. 17, 2011

(86) PCT No.: PCT/US2011/048074
§ 371 (c)(1),
(2), (4) Date: Nov. 8, 2013

(87) PCT Pub. No.: WO2012/024393
PCT Pub. Date: Feb. 23, 2012

(65) Prior Publication Data
US 2015/0078417 A1    Mar. 19, 2015

Related U.S. Application Data (60) Provisional application No. 61/397,709, filed on Aug. 17, 2010.

(51) Int. Cl.
| | | |
|---|---|---|
| *G01K 13/04* | (2006.01) | |
| *G01K 13/08* | (2006.01) | |
| *G01K 1/02* | (2006.01) | |
| *G01K 7/24* | (2006.01) | |

(52) U.S. Cl.
CPC .................. *G01K 1/024* (2013.01); *G01K 7/24* (2013.01); *G01K 2215/00* (2013.01)

(58) Field of Classification Search
CPC ............ G01K 7/00; G01K 1/02; G01K 13/04; G01K 13/08; G08C 17/00; G08C 19/00
USPC .............. 374/120, 141, 170, 142, 153, 100; 340/870.17
See application file for complete search history.

(56) References Cited

U.S. PATENT DOCUMENTS

| | | |
|---|---|---|
| 1,328,765 A | 1/1920 | Robb |
| 1,410,126 A | 3/1922 | Rosendahl |
| 1,781,549 A | 11/1930 | Johnson et al. |
| 2,169,236 A | 8/1939 | Frazier |
| 2,273,750 A | 2/1942 | Clagett, Jr. |
| 2,342,749 A | 2/1944 | Maxon, Jr. |

(Continued)

FOREIGN PATENT DOCUMENTS

| | | |
|---|---|---|
| CA | 2246191 A1 | 3/1999 |
| DE | 3539550 A1 | 6/1986 |

(Continued)

OTHER PUBLICATIONS

PCT/US2011/048074 filed Aug. 17, 2011, International Preliminary Report on Patentability and Written Opinion, Issued Feb. 19, 2013.

(Continued)

*Primary Examiner* — Gail Kaplan Verbitsky
(74) *Attorney, Agent, or Firm* — Wood Herron & Evans LLP (57) ABSTRACT

A wireless temperature sensor for a concrete delivery vehicle senses temperatures of the drum, and wirelessly transmits this data to a central processor. The sensor implements power management methods to reduce power consumption and increase battery life, permitting the use of battery power in the sensor. Temperature readings from the sensor may be used qualify or evaluate a load.

19 Claims, 6 Drawing Sheets

(56) References Cited

U.S. PATENT DOCUMENTS

| | | | |
|---|---|---|---|
| 2,543,883 A | 3/1951 | Von Saspe | |
| 2,726,074 A | 12/1955 | Ketchledge | |
| 3,160,398 A | 12/1964 | Green | |
| 3,593,966 A | 7/1971 | Munroe | |
| 3,603,084 A | 9/1971 | Okazaki | |
| 3,731,909 A | 5/1973 | Johnson | |
| 3,767,170 A | 10/1973 | Morgenstern | |
| 3,891,193 A | 6/1975 | Perry, Jr. | |
| 3,924,447 A | 12/1975 | Garrison | |
| 4,008,093 A | 2/1977 | Kitsuda et al. | |
| 4,072,435 A | 2/1978 | Coho et al. | |
| 4,097,925 A | 6/1978 | Butler, Jr. | |
| 4,117,901 A | 10/1978 | Mustered | |
| 4,117,906 A | 10/1978 | Mustered | |
| 4,318,177 A | 3/1982 | Rapp et al. | |
| 4,356,723 A | 11/1982 | Fay | |
| 4,544,275 A | 10/1985 | Hudelmaier | |
| 4,585,356 A | 4/1986 | Hudelmaier | |
| 4,846,581 A | 7/1989 | Osterlund et al. | |
| 4,900,154 A | 2/1990 | Waitzinger et al. | |
| 5,149,192 A | 9/1992 | Hamm et al. | |
| 5,152,605 A | 10/1992 | Yamada et al. | |
| 5,169,236 A | 12/1992 | Iest | |
| 5,407,299 A | 4/1995 | Sutton | |
| 5,526,841 A | 6/1996 | Detsch et al. | |
| 5,608,383 A * | 3/1997 | Neil | G08B 21/182 340/588 |
| 5,707,474 A | 1/1998 | Andersen et al. | |
| 5,713,663 A | 2/1998 | Zandberg et al. | |
| 5,752,768 A | 5/1998 | Assh | |
| 5,895,116 A | 4/1999 | Kreinheder et al. | |
| 5,948,970 A | 9/1999 | Te'eni | |
| 6,042,258 A | 3/2000 | Hines et al. | |
| 6,042,259 A | 3/2000 | Hines et al. | |
| 6,126,307 A | 10/2000 | Black et al. | |
| 6,224,250 B1 | 5/2001 | Kreinheder et al. | |
| 6,227,039 B1 | 5/2001 | Te'eni | |
| 6,286,987 B1 | 9/2001 | Goode et al. | |
| 6,484,079 B2 | 11/2002 | Buckelew et al. | |
| 6,611,755 B1 | 8/2003 | Coffee et al. | |
| 6,682,655 B2 | 1/2004 | Beckham et al. | |
| 6,695,208 B1 | 2/2004 | Chew et al. | |
| 6,805,478 B2 | 10/2004 | Aizawa et al. | |
| 6,862,521 B1 | 3/2005 | Fox | |
| 6,866,047 B1 | 3/2005 | Marvin | |
| 6,876,904 B2 | 4/2005 | Oberg et al. | |
| 6,938,716 B1 | 9/2005 | Eull | |
| 7,006,009 B2 | 2/2006 | Newman | |
| 7,064,677 B2 | 6/2006 | Newman | |
| 7,384,180 B2 | 6/2008 | Jarvinen et al. | |
| 7,386,368 B2 | 6/2008 | Andersen et al. | |
| 7,489,993 B2 | 2/2009 | Coffee et al. | |
| 7,530,728 B2 | 5/2009 | Rosaen | |
| 7,722,243 B2 | 5/2010 | Schumacher et al. | |
| 7,722,244 B2 | 5/2010 | Panuccio | |
| 7,729,831 B2 | 6/2010 | Pillar et al. | |
| 7,740,936 B2 | 6/2010 | Ogawa et al. | |
| 7,824,096 B2 | 11/2010 | Lindblom et al. | |
| 7,835,838 B2 | 11/2010 | Pillar et al. | |
| 7,950,841 B2 | 5/2011 | Klein et al. | |
| 8,020,431 B2 * | 9/2011 | Cooley | B28C 5/422 366/1 |
| 8,118,473 B2 | 2/2012 | Compton et al. | |
| 2002/0015354 A1 | 2/2002 | Buckelew | |
| 2002/0032517 A1 | 3/2002 | Buckelew et al. | |
| 2002/0048212 A1 | 4/2002 | Hill et al. | |
| 2004/0031793 A1 | 2/2004 | Garcia | |
| 2004/0218462 A1 | 11/2004 | Stephens | |
| 2004/0233971 A1 * | 11/2004 | Meads | G01K 1/026 374/208 |
| 2005/0004733 A1 | 1/2005 | Pillar et al. | |
| 2005/0043631 A1 | 2/2005 | Fraden | |
| 2005/0159843 A1 | 7/2005 | Oberg et al. | |
| 2006/0054056 A1 | 3/2006 | Jungk | |
| 2006/0287773 A1 | 12/2006 | Andersen et al. | |
| 2007/0185636 A1 | 8/2007 | Cooley et al. | |
| 2007/0189108 A1 | 8/2007 | Lindblom et al. | |
| 2007/0194019 A1 | 8/2007 | Seagle et al. | |
| 2007/0247964 A1 | 10/2007 | Ross et al. | |
| 2007/0263478 A1 | 11/2007 | Burch | |
| 2008/0009976 A1 | 1/2008 | Andersen et al. | |
| 2008/0027583 A1 | 1/2008 | Andersen et al. | |
| 2008/0027584 A1 | 1/2008 | Andersen et al. | |
| 2008/0103662 A1 | 5/2008 | Pillar et al. | |
| 2008/0144424 A1 | 6/2008 | Schumacher et al. | |
| 2008/0316856 A1 | 12/2008 | Cooley et al. | |
| 2009/0037026 A1 | 2/2009 | Sostaric et al. | |
| 2009/0064903 A1 | 3/2009 | Buesing et al. | |
| 2009/0103392 A1 * | 4/2009 | Bilger | B28C 5/468 366/4 |
| 2009/0231949 A1 | 9/2009 | Rosaen | |
| 2009/0292572 A1 | 11/2009 | Alden et al. | |
| 2009/0295367 A1 * | 12/2009 | Fauveau | G01D 21/00 324/115 |
| 2010/0312406 A1 | 12/2010 | Cooley et al. | |
| 2010/0312438 A1 | 12/2010 | Cooley et al. | |
| 2011/0004332 A1 | 1/2011 | Andersen | |
| 2011/0004333 A1 | 1/2011 | Andersen | |
| 2011/0004444 A1 * | 1/2011 | Farrow | G01P 15/0891 702/187 |
| 2011/0029134 A1 | 2/2011 | Hazrati et al. | |
| 2011/0077778 A1 | 3/2011 | Berman | |
| 2012/0004790 A1 | 1/2012 | Cooley et al. | |
| 2015/0298351 A1 * | 10/2015 | Beaupre | B28C 7/0418 366/7 |
| 2016/0018383 A1 * | 1/2016 | Radjy | G01N 33/383 73/53.01 |

FOREIGN PATENT DOCUMENTS

| | | |
|---|---|---|
| DE | 4237543 A1 | 5/1994 |
| DE | 4437970 A1 | 5/1996 |
| DE | 19952462 A1 | 5/2001 |
| EP | 0126573 A1 | 11/1984 |
| EP | 1184353 A1 | 3/2002 |
| GB | 2233100 A | 1/1991 |
| GB | 2329027 A | 3/1999 |
| GB | 2344296 A | 6/2000 |
| GB | 2392502 A | 3/2004 |
| GB | 2426347 A | 11/2006 |
| JP | 58112707 A | 7/1983 |
| JP | 59016531 A | 1/1984 |
| JP | 59128024 A | 7/1984 |
| JP | 60006412 A | 1/1985 |
| JP | 60039235 A | 3/1985 |
| JP | 01045605 A | 2/1989 |
| JP | 2003341413 A | 12/2003 |
| WO | 02094526 A1 | 11/2002 |
| WO | 2005080058 A1 | 9/2005 |
| WO | 2008157690 A2 | 12/2008 |
| WO | 2009/126138 A1 | 10/2009 |
| WO | 2009144523 A2 | 12/2009 |
| WO | 2010/110814 A1 | 9/2010 |
| WO | 2010/111204 A1 | 9/2010 |

OTHER PUBLICATIONS

DE19952462 English Abstract, May 3, 2001.

International Bureau of WIPO, Preliminary Search Report and Written Opinion for PCT/US2005/004405 reported Aug. 14, 2006.

Shepherdson, Robin: "Touch screen batch plant makes Con casts's pipe production go round"; Concrete Plant International, Issue 02-02, p. 1-3.

Scale-iron Inc.; "MixTron II mixer water dosing"; product pamphlet, p. 1-2.

Ultacontrol; "Introducing the all New Ultameter Digital Central Mix Concrete Slump Meter and Slump Control"; product pamphlet, copyright 2000, p. 1-2.

Hugh Wang et al., Interaction of Materials Used in Concrete, Concrete International, Apr. 2006, pp. 47-52.

(56) References Cited

OTHER PUBLICATIONS

Dirk Lowke et al., Effect of Mixing Energy on Fresh Properties of SCC, Paper, Technical University of Munich, Centre of Building Materials, p. 1-8.
European Patent Office, International Search Report for PCT/US2008/067497 reported Jul. 20, 2009.
Amziane et al., Measurement of Workability of Fresh Concrete Using a Mixing Truck, Journal of Research of the National Institute of Standards and Technology, vol. 101, No. 1, pp. 55-56, Jan.-Feb. 2005.
Hoffman et al., "Remote Monitoring and Diagnostics of Large Rotation Machinery," 2003, IEEE, p. 47-55.

* cited by examiner

WIRELESS TEMPERATURE SENSOR FOR CONCRETE DELIVERY VEHICLE

CROSS REFERENCE TO RELATED APPLICATIONS

This application is related to pending U.S. application Ser. No. 10/599,130, which was filed Feb. 14, 2005 as a PCT Application designating the United States claiming priority to U.S. Provisional Application 60/554,720, and which subsequently entered the U.S. National Phase, and is related to U.S. application Ser. No. 11/764,832, filed Jun. 19, 2007, and is related to U.S. application Ser. No. 11/834,002, filed Aug. 5, 2007. All of the above-mentioned applications are hereby incorporated by reference.

FIELD OF THE INVENTION

The present invention generally relates to instrumentation used on delivery vehicles and particularly to mobile concrete mixing trucks that mix and deliver concrete. More specifically, the present invention relates to the gathering of temperature data using a sensor mounted to the drum on a concrete truck.

BACKGROUND OF THE INVENTION

Mobile concrete mixing trucks are used to mix concrete and to deliver that concrete to a site where the concrete may be required. Generally, the particulate concrete ingredients are loaded at a central depot, and liquid component is added at the central depot and while in transit. The liquid component traditionally includes water, but in more modern applications may also include chemical additives of various types.

A number of patent filings have explored the possibility for monitoring the mixing of concrete, or controlling the process of adding liquid component.

Zandberg et al., U.S. Pat. No. 5,713,663 (the '663 patent), the disclosure of which is hereby incorporated herein by reference, describes a method and apparatus of measuring slump of concrete in a mixing barrel from the driving force required to rotate the mixing barrel. The system monitors the torque loading on the driving means used to rotate the mixing barrel, and adds liquid component in attempt to approach a predetermined minimum torque loading related to the amount of the particulate ingredients in the drum.

Buckelew et al., U.S. Pat. No. 6,484,079 (the '079 patent), the disclosure of which is also hereby incorporated herein by reference, describes a method that remotely monitors and reports sensor data associated with a concrete delivery vehicle. More specifically, the data is collected and recorded at the delivery vehicle, and then reported to a dispatch center upon a 'transmission event'.

U.S. patent application Ser. No. 10/599,130, filed by the assignee of the present application, discloses an improved slump measurement method, improved liquid management methods, and improved mixture measurement and reporting methods.

U.S. patent application Ser. No. 11/764,832, filed by the assignee of the present application, discloses a concrete truck management and slump measurement system using a temperature sensor mounted to the mixing drum. Specifically, a temperature probe, such as mounted to a hatch door of the drum, senses mixture temperature which may be used to track the level of cure of the mixture and make appropriate adjustments. This system also features an accelerometer sensor and improvements in communication systems and mixture management methods.

U.S. patent application Ser. No. 11/834,002, filed by the assignee of the present application, discloses an improved concrete truck management system in which multiple chemical additives are controllably managed and added to the mixing drum, under either local or remote control. Electronic identification is used to track the additives in use.

While these various systems have been proposed and implemented, improvements continue to be needed, particularly in the use of remote sensors on concrete delivery vehicles.

SUMMARY OF THE INVENTION

According to one aspect of the present invention, a wireless temperature sensor for measuring and transmitting temperature readings on a concrete delivery vehicle, includes a processor, temperature sensor, wireless transmitter and vibration sensor. The processor periodically receives vibration signals from said vibration sensor, and in response to detected vibration, obtains a temperature reading from said temperature sensor and causes the transmitter to transmit the temperature reading. In the absence of detected vibration, the processor enters a power consumption mode to conserve energy.

In specific embodiments, the temperature sensor, wireless transmitter and vibration sensor may be enabled by said processor, and the processor enables the temperature sensor and wireless transmitter only upon detection of vibration from the vibration sensor, and enables the vibration sensor periodically only for a sufficient duration of time to measure vibration.

DETAILED DESCRIPTION OF THE EMBODIMENTS OF THE INVENTION

Figure 1:
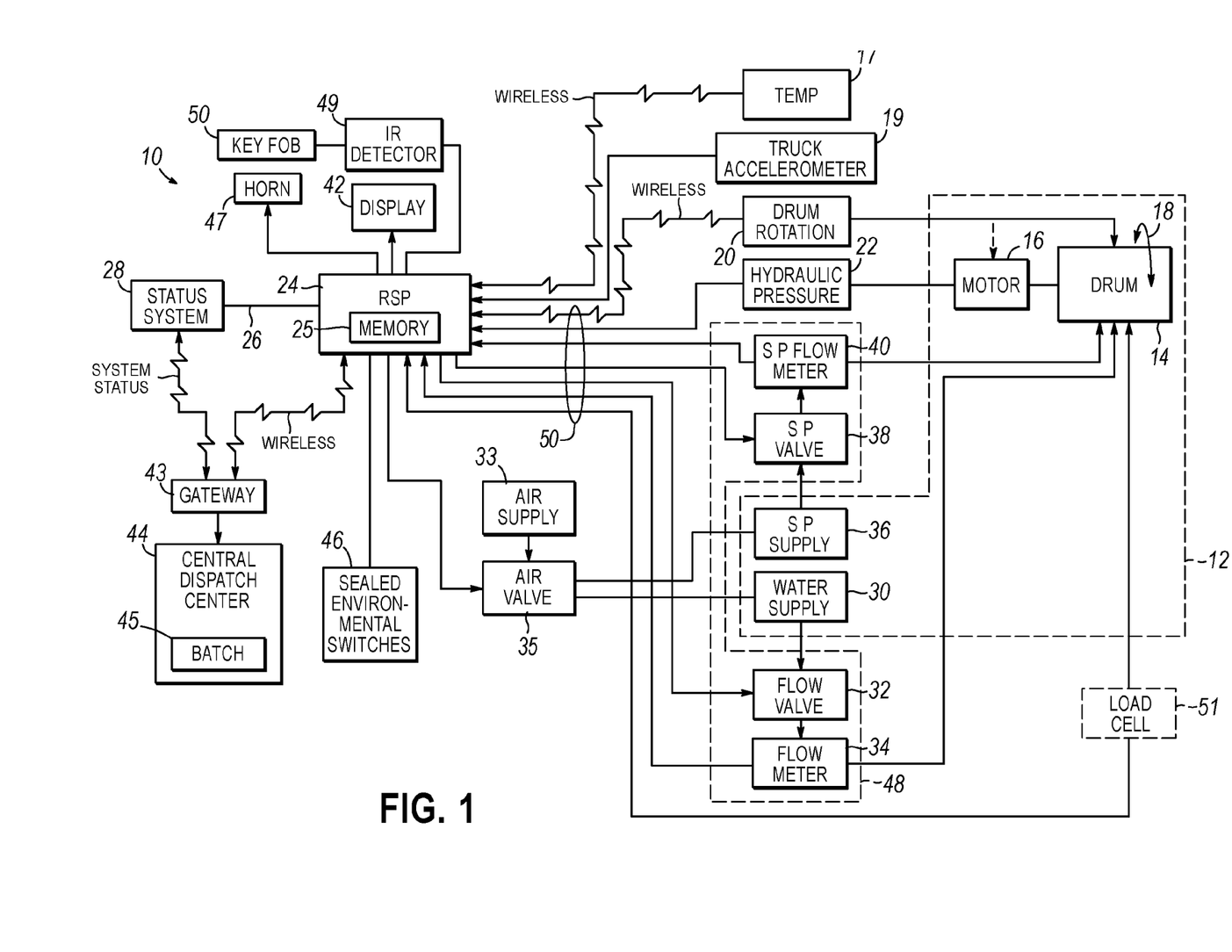
FIG. 1 is block diagram of a system for calculating and reporting slump in a delivery vehicle constructed in accordance with an embodiment of the invention.

Referring to FIG. 1, a block diagram of a system 10 for calculating and reporting slump in a delivery vehicle 12 is illustrated. Delivery vehicle 12 includes a mixing drum 14 for mixing concrete having a slump and a motor or hydraulic drive 16 for rotating the mixing drum 14 in the charging and discharging directions, as indicated by double arrow 18. System 10 comprises a dual temperature sensor 17, which may be installed directly to on the mixing drum 14, more specifically the access door of the mixing drum 14, and configured to sense both the load temperature as well as the skin temperature of the mixing drum 14. The dual temperature sensor 17 may be coupled to a wireless transmitter. A wireless receiver mounted to the truck could capture the transmitted signal from the dual temperature sensor 17 and determine the temperature of both the load and the mixing drum skin, as elaborated more fully below.

System 10 further includes an acceleration/deceleration/tilt sensor 19, which may be installed on the truck itself, and configured to sense the relative acceleration, deceleration of the truck as well as the degree of tilt that the truck may or may not be experiencing. System 10 comprises a rotational sensor 20, which may be installed directly on or mounted to the mixing drum 14, or included in the motor driving the drum, and configured to sense the rotational speed and direction of the mixing drum 14. The rotational sensor may include a series of magnets mounted on the drum and positioned to interact with a magnetic sensor on the truck to create a pulse each time the magnet passes the magnetic sensor. Alternatively, the rotational sensor may be incorporated in the driving motor 16, as is the case in concrete trucks using Eaton, Rexroth, or other hydraulic motors and pumps. In a third potential embodiment, the rotational sensor may be an integrated accelerometer mounted on the drum of the concrete truck, coupled to a wireless transmitter. In such an embodiment a wireless receiver mounted to the truck could capture the transmitted signal from the accelerometer and determine therefrom the rotational state of the drum. System 10 further includes a hydraulic sensor coupled to the motor or hydraulic drive 16 and configured to sense a hydraulic pressure required to turn the mixing drum 14.

System 10 further comprises a processor or ready slump processor (RSP) 24 including a memory 25 electrically coupled to the hydraulic sensor 22 and the rotational sensor 20 and configured to qualify and calculate the current slump of the concrete in the mixing drum 14 based the rotational speed of the mixing drum and the hydraulic pressure required to turn the mixing drum, respectively. The rotational sensor and hydraulic sensor may be directly connected to the RSP 24 or may be coupled to an auxiliary processor that stores rotation and hydraulic pressure information for synchronous delivery to the RSP 24. The RSP 24, using memory 25, may also utilize the history of the rotational speed of the mixing drum 14 to qualify a calculation of current slump.

A communications port 26, such as one in compliance with the RS 485 modbus serial communication standard, may be configured to communicate the slump calculation to a status system 28 commonly used in the concrete industry, such as, for example, TracerNET (now a product of Trimble Navigation Limited, Sunnyvale, Calif.), which, in turn, wirelessly communicates with a central dispatch center 44. An example of a wireless status system is described by U.S. Pat. No. 6,611,755, which is hereby incorporated herein in its entirety. It will be appreciated that status system 28 may be any one of a variety of commercially available status monitoring systems.

Alternatively, or in addition, a separate communication path on a licensed or unlicensed wireless frequency, e.g. a 2.4 GHz or other frequency, e.g., 900 MHz, 433 MHz, or 418 MHz frequency, may be used for communications between RSP 24 and the central dispatch office when concrete trucks are within range of the central dispatch office, permitting more extensive communication for logging, updates and the like when the truck is near to the central office, as described below. A further embodiment might include the ability for truck-to truck communication/networking for purposes of delivering programming and status information. Upon two trucks identifying each other and forming a wireless connection, the truck that contains a later software revision could download that revision to the other truck, and/or the trucks could exchange their status information so that the truck that returns first to the ready mix plant can report status information for both to the central system. RSP 24 may also be connected to the central dispatch office or other wireless nodes, via a local wireless connection, or via a cellular wireless connection. RSP 24 may over this connection directly deliver and receive programming, ticket and state information to and from the central dispatch center without the use of a status system.

Delivery vehicle 12 further includes a water supply 30 and system 10 further comprises a flow valve 32 coupled to the water supply 30 and configured to control the amount of water added to the mixing drum 14 and a flow meter 34 coupled to the flow valve 32 and configured to sense the amount of water added to the mixing drum 14. The water supply is typically pressurized by a pressurized air supply generated by the delivery truck's engine. RSP 24 is electrically coupled to the flow valve 32 and the flow meter 34 so that the RSP 24 may control the amount of water added to the mixing drum 14 to reach a desired slump. RSP 24 may also obtain data on water manually added to the drum 14 by a hose connected to the water supply, via a separate flow sensor or from status system 28. A separate embodiment might utilize a positive displacement water pump in place of a pressurized system. This would eliminate the need for repeated pressurizing, depressurizing that may occur in the present embodiment. Also, the volume of water dispensed might be more accurately achieved. It would also facilitate direct communication between the RSP and the pump.

Delivery vehicle 12 may further include one or more chemical additive supplies 36 and system 10 may further comprise a chemical additive flow valve 38 coupled to the chemical additive supply 36 and configured to control the amount of chemical additive added to the mixing drum 14, and a chemical additive flow meter 40 coupled to the chemical additive flow valve 38 and configured to sense the amount of chemical additive added to the mixing drum 14. In one embodiment, RSP 24 is electrically coupled to the chemical additive flow valve 38 and the chemical additive flow meter 40 so that the RSP 24 may control the amount of chemical additive added to the mixing drum 14 to reach a desired slump. Alternatively, chemical additive may be manually added by the operator and RSP 24 may monitor the addition of chemical additive and the amount added. Furthermore, colorant may be similarly controlled by RSP, and delivered from a storage tank on the vehicle.

Delivery vehicle 12 further includes an air supply 33 and system 10 may further comprise an air flow valve 35 coupled to the chemical additive supply 36 and the water supply 30 and configured to pressurize the tanks containing the chemical additive supply and the water supply. In one embodiment, RSP 24 is electrically coupled to the air flow valve so that the RSP 24 may control the pressure within the chemical additive supply and the water supply.

System 10 may also further comprise an external display, such as display 42. Display 42 actively displays RSP 24 data, such as slump values. The central dispatch center can comprise all of the necessary control devices, i.e. a batch control processor 45. Wireless communication with the central dispatch center can be made via a gateway radio base station 43. It should be noted that the status system display and the display 42 may be used separately from one another or in conjunction with one another.

A set of environmentally sealed switches 46, e.g. forming a keypad or control panel, may be provided by the RSP 24 to permit control and operator input, and to permit various override modes, such as a mode which allows the delivery vehicle 12 to be operated in a less automated manner, i.e., without using all of the automated features of system 10, by using switches 46 to control water, chemical additive, and the like. (Water and chemical additive can be added manually without having to make a manual override at the keypad, in which case the amounts added are tracked by the RSP 24.) A keypad on the status system 28 may also be used to enter data into the RSP 24 or to acknowledge messages or alerts, but switches 46 may be configured as a keypad to provide such functions directly without the use of a status system.

A horn 47 is included for the purpose of alerting the operator of such alert conditions.

Operator control of the system may also be provided by an infrared or RF key fob remote control 50, interacting with an infrared or RF signal detector 49 in communication with RSP 24. By this mechanism, the operator may deliver commands conveniently and wirelessly. Furthermore, infrared or RF signals exchanged with detector 49 may be used by the status system 28 for wireless communication with central dispatch center 44 or with a batch plant controller when the truck is at the plant.

In one embodiment of the present invention, all flow sensors and flow control devices, e.g., flow valve 32, flow meter 34, chemical additive flow valve 38, and chemical additive flow meter 40, are contained in an easy-to-mount manifold 48 while the external sensors, e.g., rotational sensor 20 and hydraulic pressure sensor 22, are provided with complete mounting kits including all cables, hardware and instructions. It should be noted that all flow sensors and flow control devices can be mounted inline, separately from one another. In another embodiment, illustrated in FIG. 6, the water valve and flow meter may be placed differently, and an additional valve for manual water may be included, to facilitate cold weather operation. Varying lengths of interconnects 50 may be used between the manifold 48, the external sensors 20, 22, and the RSP 24. Thus, the present invention provides a modular system 10.

In operation, the RSP 24 manages all data inputs, e.g., drum rotation, hydraulic pressure, flow, temperature, water and chemical additive flow, to calculate current slump and determine when and how much water and/or chemical additive should be added to the concrete in mixing drum 14, or in other words, to a load. (As noted, rotation and pressure may be monitored by an auxiliary processor under control of RSP 24.) The RSP 24 also controls the water flow valve 32, an optional chemical additive flow valve 38, and an air pressure valve (not shown). (Flow and water control may also be managed by another auxiliary processor under control of the RSP 24.) The RSP 24 typically uses ticket information and discharge drum rotations and motor pressure to measure the amount of concrete in the drum, but may also optionally receive data from a load cell 51 coupled to the drum for a weight-based measurement of concrete volume. Data from load cell 51 may be used to compute and display the amount of concrete poured from the truck (also known as concrete on the ground), and the remaining concrete in the drum. Weight measurements generated by load cell 51 may be calibrated by comparing the load cell measurement of weight added to the truck, to the weight added to the truck as measured by the batch plant scales.

The RSP 24 also automatically records the slump at the time the concrete is poured, to document the delivered product quality, and manages the load during the delivery cycle. The RSP 24 has three operational modes: automatic, manual and override. In the automatic mode, the RSP 24 adds water to adjust slump automatically, and may also add chemical additive in one embodiment. In the manual mode, the RSP 24 automatically calculates and displays slump, but an operator is required to instruct the RSP 24 to make any additions, if necessary. In the override mode, all control paths to the RSP 24 are disconnected, giving the operator complete responsibility for any changes and/or additions. All overrides are documented by time and location.

Figure 2:
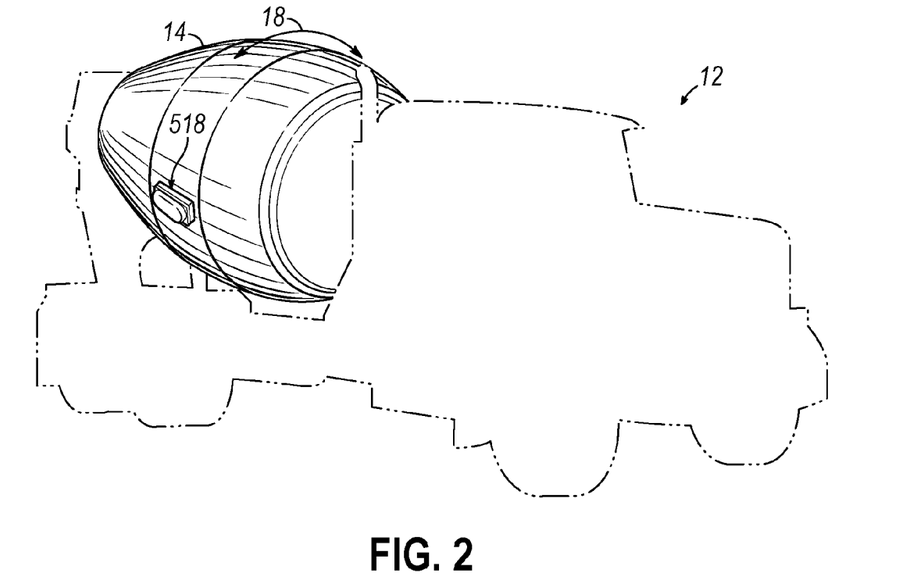
FIG. 2 is a side view of a concrete mixing truck to illustrate the location of the access door on the side of the mixing drum.

FIG. 2 illustrates the location of the mixing drum access door 518 on the mixing drum 14. The mixing drum access door 518 is a convenient location for a temperature sensor such as a dual temperature sensor 17 elaborated below. In the disclosed embodiment, the sensor is attached to the exterior of the access door. In other embodiments, the sensor could be attached elsewhere on the concrete drum other than the exterior portion of the access door, and may be attached to other concrete mixing equipment such as a stationary drum or a portable mixer. Furthermore, in alternative embodiments, a noncontact temperature sensor, such as an infrared sensor, may be used to measure the temperature of the load without requiring contact therewith.

Figure 3:
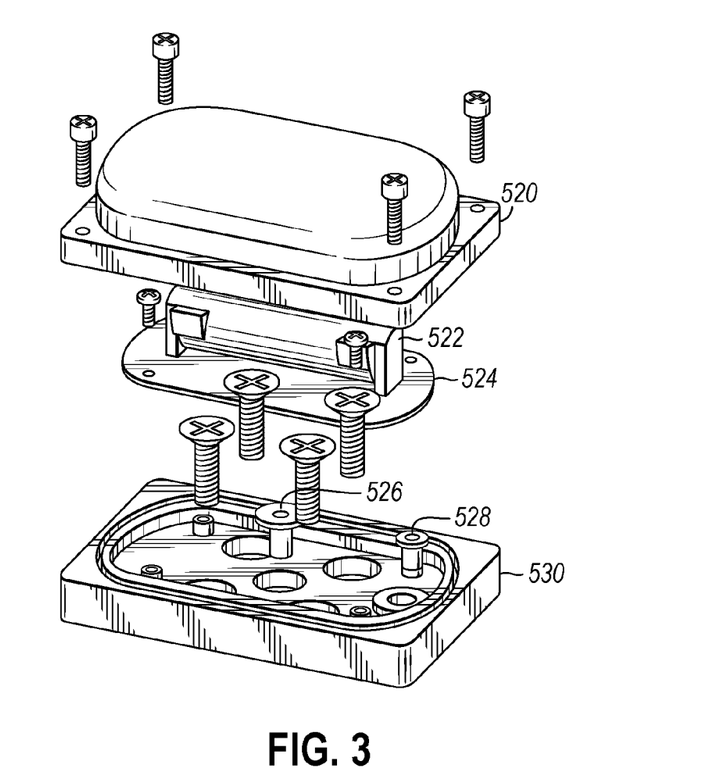
FIG. 3 is an exploded view of the dual temperature sensor.

Referring now to FIG. 3, the sensor mounted to the mixing drum access door 518 may use a dual temperature sensor mount 530. The load temperature sensor 526 could be a thermocouple which protrudes through the center of the mount, through the mixing drum access door skin and into the load. It should be noted that the load sensor is insulated from the mount and the drum skin. The load sensor is hardened using a plasma spray process and streamlined to permit a smooth flow of the load over the sensor. The plasma spray process used for hardening the sensor uses inert gas—usually nitrogen or argon—excited by a pulsed DC arc to ionize the gas and produce plasma. Other gasses—mainly hydrogen and helium—are often introduced in small quantity in order to increase the ionization. The plasma gasses are introduced at high volume and high velocity, and are ionized to produce a plume that ranges in temperature from about 12,000° to 30,000° F. Powder feedstock is then injected into this hot gas stream (called a plume), heated very quickly, and deposited onto the work piece. Thermal spray coatings, more specifically plasma spray, are often used to protect against abrasion, erosion, adhesive wear, fretting, galling, and cavitation. Abrasion and erosion are regularly addressed using tungsten carbide coatings along with a series of superalloys. The plasma spray process is available through CTS 5901 Creek Road Cincinnati, Ohio 45242. The skin temperature sensor 528 also could be a thermocouple, which protrudes through the corner of the mount, and makes contact with the mixing drum skin. Circuit board 524 is affixed to the dual temperature sensor mount 530 using four screws, and contains the thermocouple control and the radio transmitter control. A radio antenna 522 is attached to the circuit board. The dual temperature sensor cover 520 is affixed to the dual temperature sensor mount 530 using four screws. As described below, with suitable power management in accordance with principles of the present invention, the dual temperature sensor may be battery powered.

Using a temperature sensor, temperature readings taken from the mixing drum, can be utilized as a factor when calculating the slump profile. It should also be noted that a separate device could be used in measuring the ambient air temperature. Furthermore, the load temperature may be used to identify, from among a group of loads, which are hottest and thus determine the order in which the loads should be poured. Furthermore, the time left until a load will set, and the effect or need for additives, can be derived from load temperature. Finally, the temperature profile measured by the sensor as the drum is rotating may be used to identify the load size as noted above.

Figure 4:
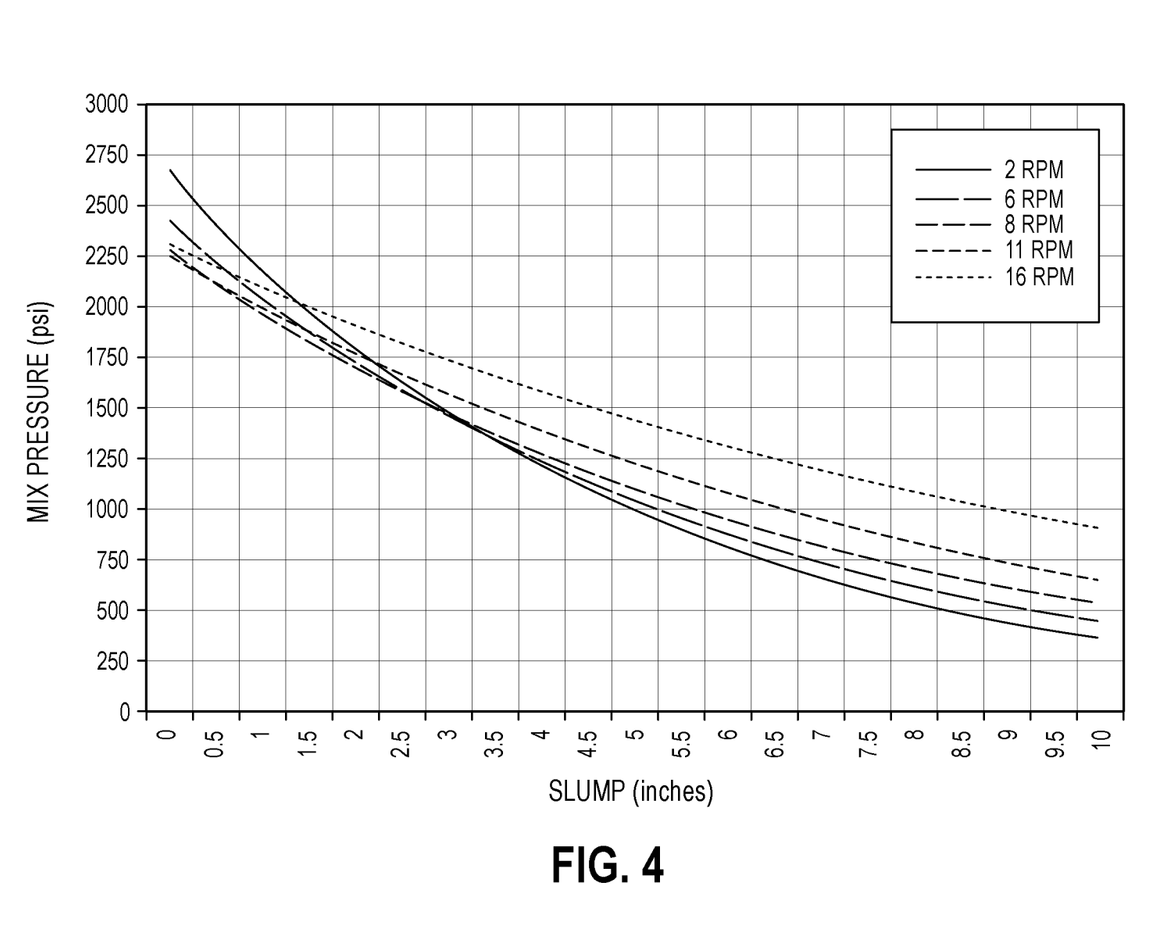
FIG. 4 is an illustration of the relationship between hydraulic mix pressure and slump.

FIG. 4 illustrates the relationship between the hydraulic mix pressure applied to a drum of ready mix concrete and the slump of the concrete. The relationship is dependent on the revolutions per minute of drum rotation. As the RPMs increase the relationship becomes more linear in nature, as the RPMs decrease the relationship becomes more logarithmic. It should be noted that there are other factors that can affect the slump profile. Some of these factors are truck tilt, load size, load weight, truck hydraulic equipment and truck acceleration/deceleration. Relationships utilizing these factors could be taken into account when developing a slump profile.

Figure 5:
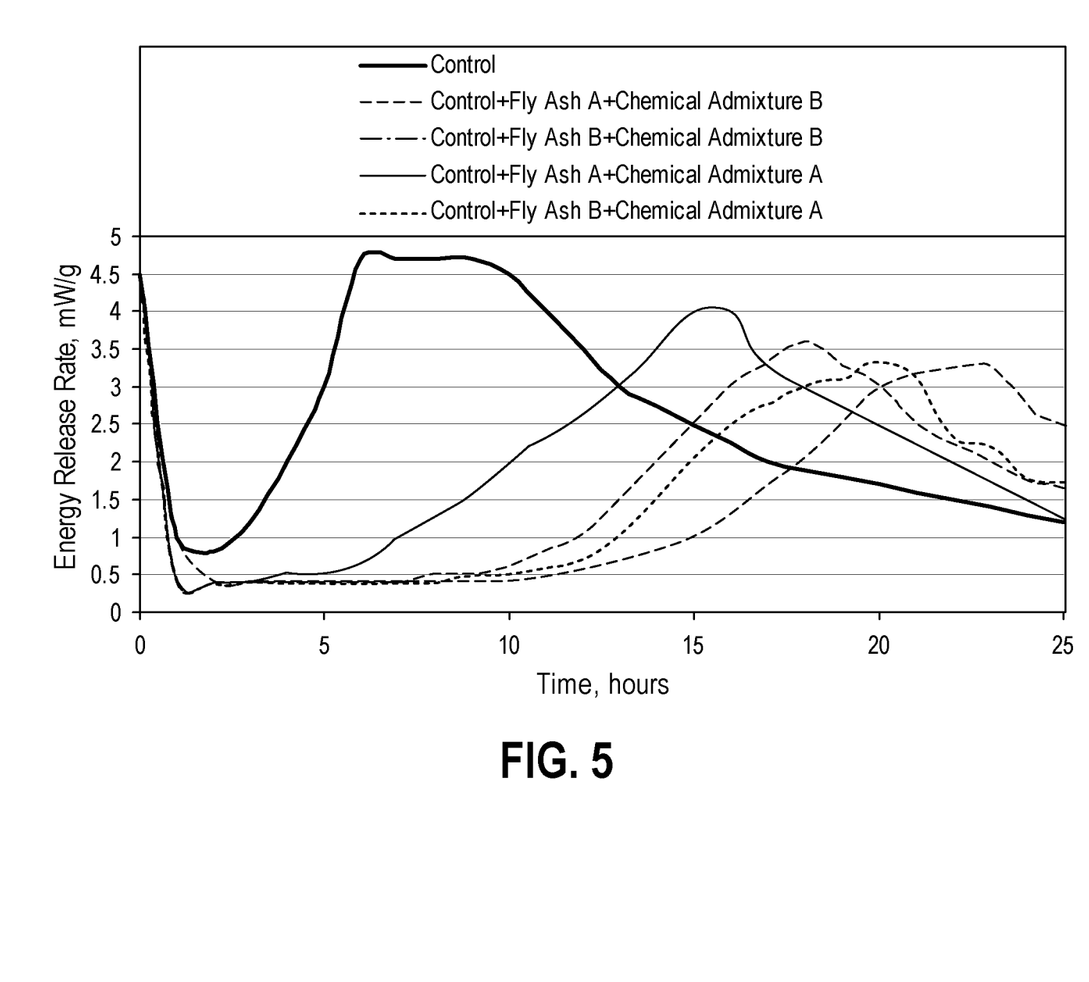
FIG. 5 is an illustration of the relationship of the Energy Release Rate to the relative time for concrete to go through a hydration process as it pertains to mix composition.

FIG. 5 illustrates the relationship between concrete energy release rate and time as it pertains to mix composition. The information is adapted from an article published in the April 2006 edition of Concrete International, authored by Hugh Wang, C. Qi, Hamid Farzam, and Jim Turici. The integral of the area under the release rate curves, is the total released heat during the hydration process. The total amount of heat released is related to the cement reactivity which, in turn, reflects the strength development of the concrete. Therefore utilizing the dual temperature sensor 17 to obtain a temperature reading with respect to time within the mixing drum 14 could be used to determine the strength of the cured concrete. It should be noted that the wireless nature of the dual temperature sensor permits the ready use of the sensor on a rotating drum without the difficulties associated with establishing wired connections from the sensor to a control console. Furthermore, as noted above, a wireless sensor as described herein may be utilized in conjunction with other types of mixers, not limited to concrete trucks, such as stationary or portable or semi-portable rotating mixers.

As noted above, various statistics and parameters are used by the ready slump processor in operation. These statistics and parameters are available for upload from the processor to the central office, and can be downloaded to the processor, as part of a messaging operation. Some values are overwritten repeatedly during processing, but others are retained until the completion of a delivery cycle, as is elaborated above. The above-referenced US Patent applications of the present assignee incorporate specific listings of statistics and parameters for one specific embodiment of the invention, and other selections of parameters and statistics may be gathered as well.

Figure 6:
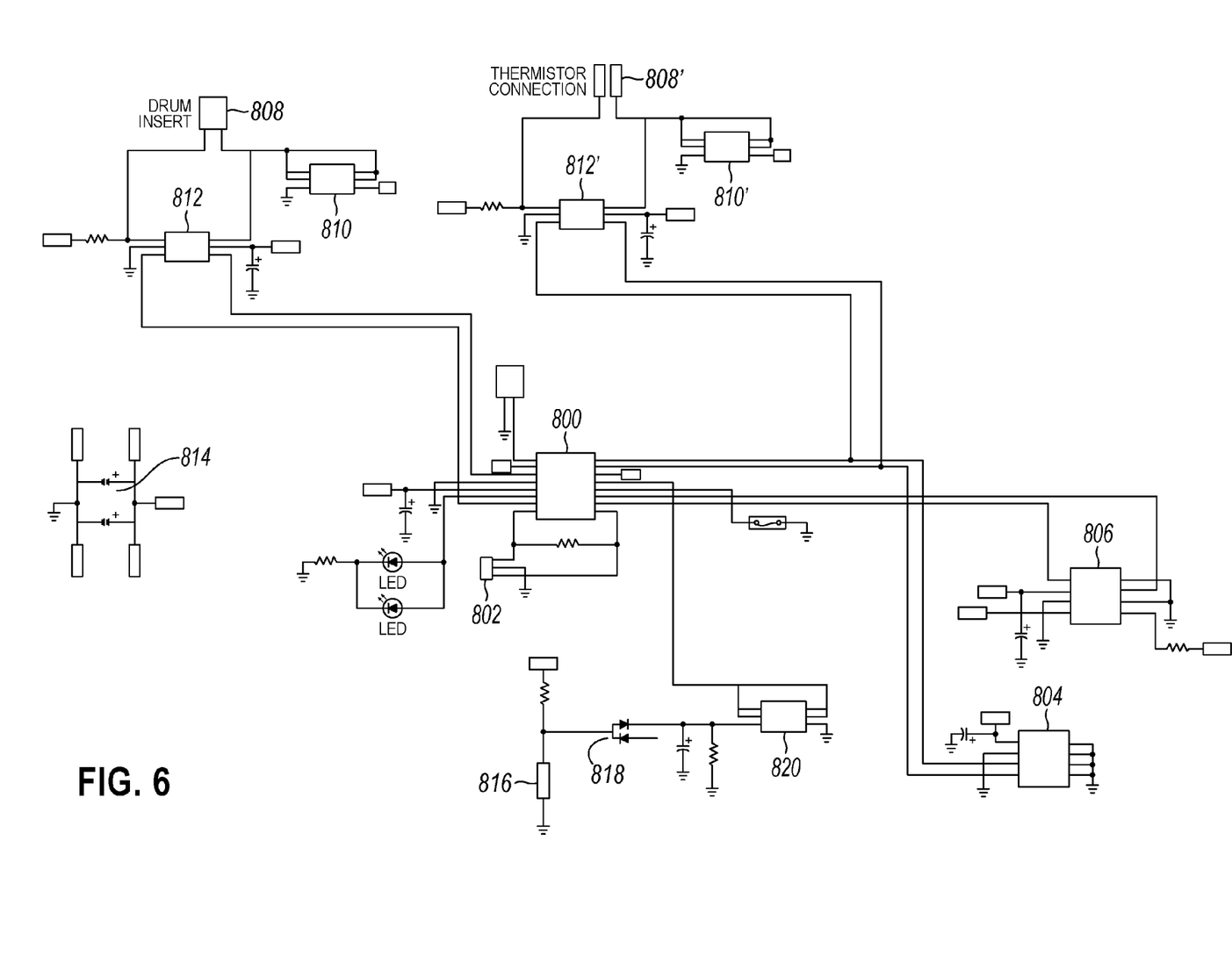
FIG. 6 is an exemplary circuit diagram of a control circuit for a wireless temperature sensor and transmitter implementing power management techniques in accordance with principles of the present invention.

Referring now to FIG. 6, a circuit diagram for the circuitry used with the wireless temperature sensor is illustrated. At the heart of this circuit is a PIC microprocessor 800, for example an MC 68HC608 processor, which includes sleep modes which can be utilized to reduce power consumption in accordance with principles of the present invention as explained more fully below. Microprocessor 800 uses an 8 MHz clock established by crystal 802, and operates using programming in a CMOS serial EPROM memory 804.

Microprocessor 800 communicates with the RS processor (FIG. 1) via wireless transmission, e.g., using a 434 MHz wireless transmitter such as a TXM-433-LR transmitter chip 806 coupled to an output line of microprocessor 800. Transmitter 806 may be enabled and disabled by microprocessor 800 via an enable connection.

Microprocessor 800 collects temperature data from a thermister sensor 808 which is coupled, as noted above, to the load within the mixing drum. Current is supplied to thermistor 808 via an N-type MOSFET 810 operating in enhancement mode and used as a switch to ground. The voltage produced by thermistor 808 when MOSFET 810 is "on", is representative of the temperature of the thermistor 808. This voltage is converted to a digital signal by an analog to digital converter 812, which may for example be an ADS1100 A/D converter. The resulting digital signal is delivered to microprocessor 800.

A/D converter and MOSFET switch 810 may be enabled or disabled selectively by microprocessor 800 using an enable line coupled to the gate of MOSFET 810 (thus enabling current flow through thermistor 808), and an enable line coupled to A/D converter 812. When not enabled, the current draw by thermistor 808 and A/D converter is de minimus.

For ambient temperature measurement, a second thermistor is connected to terminals 808', and the signal from the second thermistor is read by a similar connection of an MOSFET 810' and A/D converter 812', each of which is similarly selectively enabled by microprocessor 800.

As noted above, the wireless temperature sensor uses various power management techniques to permit the use of battery power, such as from one or optionally two 3.6 volt lithium cells 814. Power management is accomplished by the use of two power saving techniques. First, microprocessor 800 does not operate unless vibration (indicative of drum/truck operation) is detected by vibration sensor 816. Vibration causes closure of the contacts in vibration sensor 816, reverse biasing a Schottky barrier diode 818 and thereby permitting discharge of a 1 microfarad capacitor that is ordinarily kept charge by trickle current from a 2.7 megaohm resistor connected in series with sensor 816. The voltage level across the 1 microfarad capacitor, which is indicative of vibration, is amplified by an N-type enhancement mode MOSFET 820, having its gate connected to the 1 microfarad capacitor, source connected to ground, and drain and substrate terminals connected to microprocessor 800. Vibration detected by sensor 816 produces a low current draw from the processor via MOSFET 820, indicating vibration. Microprocessor 800 may selectively connect a pull-up resistor to the processor output coupled to the drain of MOSFET 820, at the moment of a vibration measurement, and disconnect the pull-up resistor otherwise, thus minimizing power consumption when vibration is not being measured.

Figure 7:
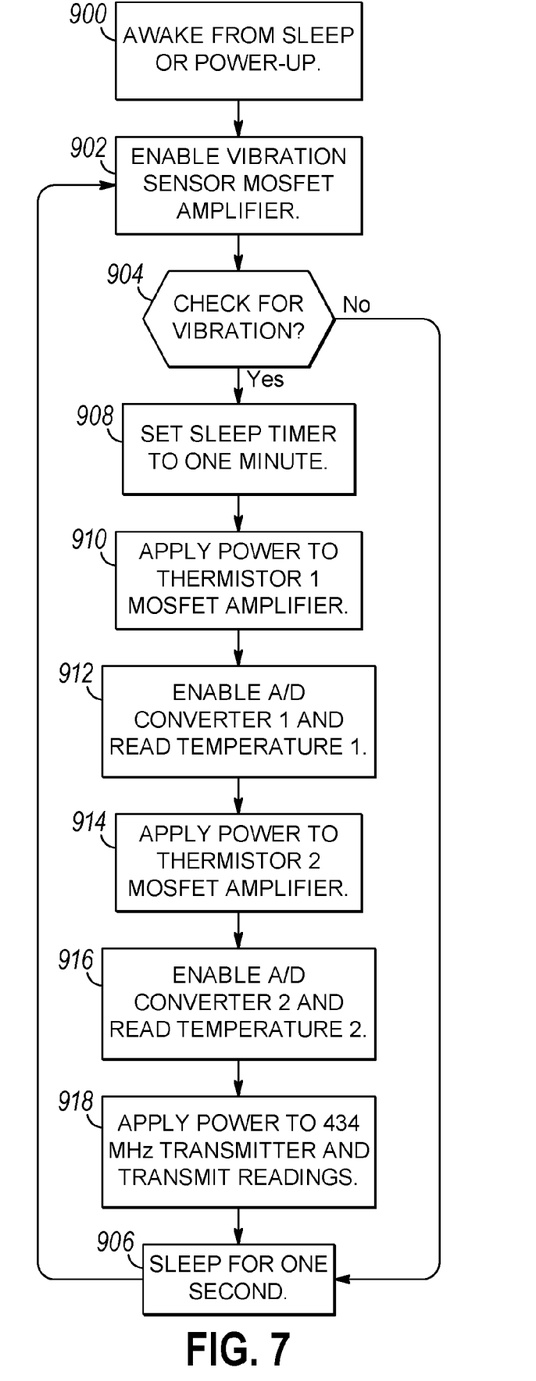
FIG. 7 is an exemplary flow chart of the operations performed by the software in the microprocessor of the circuit of FIG. 6.

Referring now to FIG. 7, the software in processor 800 operates to minimize power consumption while providing needed temperature readings, as follows. When the processor 800 awakes from a sleep operation, or is powered up (step 900), the processor initially enables 902 the vibration sensor (by connecting the pull up resistor noted above) and reads 904 the sensor for indicated vibration. In the absence of vibration 904, the processor enters a sleep mode for one second (step 906), after which a check is made for vibration. It will be recognized that in the absence of any vibration, this routine draws very little power.

In the event of vibration, i.e., active use of the mixing drum or delivery vehicle, flow proceeds from step 904 to step 908, in which a sleep timer is set to a value of one minute This ensures that data will be reported for one minute after any detected vibration. The processor then applies power (step 910) to the thermistor 808 and A/D converter 812, and measures the temperature (step 912) via A/D converter 812, and similarly applies power (step 914) to thermistor 808' and A/D converter 812', and measures the temperature (step 916) via A/D converter 812'. Thereafter, the processor enables the transmitter 806, and causes a transmission of the measured temperature data to the RS processor (see FIG. 1).

In the event vibrations end, at most one minute thereafter, the processor will discontinue the use of the temperature sensors and transmitter, reducing power consumption to a very low level. The circuit described above has been found to consume about 1 micro amp of average current.

While the present invention has been illustrated by a description of embodiments and while these embodiments have been described in some detail, it is not the intention of the Applicants to restrict or in any way limit the scope of the appended claims to such detail. Additional advantages and modifications other than those specifically mentioned herein will readily appear to those skilled in the art. The invention in its broader aspects is therefore not limited to the specific details, representative apparatus and method, and illustrative examples shown and described.

The invention claimed is:

1. A wireless temperature sensor apparatus for measuring and transmitting temperature readings of concrete contained in a mixer drum mounted on a concrete delivery mixing truck, comprising:
    a processor mounted on the truck configured to receive signals from a temperature sensor via a wireless transmitter, and receive signals from a vibration sensor, the signals relating to a concrete load mixed in the concrete delivery mixing truck drum;
    a temperature sensor mounted to the mixer drum on the truck, the mixer drum-mounted temperature sensor being effective to measure temperature of the concrete load within the truck-mounted concrete mixer drum;
    a wireless transmitter mounted to the mixer drum on the truck and communicative with the processor and temperature sensor, the wireless transmitter being effective for transmitting to the processor a signal corresponding to the temperature of the concrete in the mixer drum as detected by the temperature sensor;
    the vibration sensor mounted to the drum or truck and communicative with the processor to deliver signals indicative of vibration in response to truck, truck engine or drum motion;
    the processor periodically receiving vibration signals from the vibration sensor, and, during periods of detected vibration, obtaining a temperature reading from the temperature sensor and causing the transmitter to transmit the temperature reading, and in the absence of detected vibration, the processor entering a power consumption mode to conserve energy.

2. The sensor apparatus of claim 1 wherein the temperature sensor may be enabled by the processor, the processor enabling the temperature sensor in response to detection of vibration from the vibration sensor.

3. The sensor apparatus of claim 1 wherein the vibration sensor may be enabled by the processor, the processor enabling the vibration sensor periodically for a sufficient duration of time to measure vibration.

4. The sensor apparatus of claim 2 wherein the vibration sensor may be enabled by the processor, the processor enabling the vibration sensor periodically for a sufficient duration of time to measure vibration.

5. The sensor apparatus of claim 1 wherein the wireless transmitter may be enabled by the processor, the processor enabling the wireless transmitter in response to detection of vibration from the vibration sensor.

6. The sensor apparatus of claim 2 wherein the wireless transmitter may be enabled by the processor, the processor enabling the wireless transmitter in response to detection of vibration from the vibration sensor.

7. The sensor apparatus of claim 3 wherein the wireless transmitter may be enabled by the processor, the processor enabling the wireless transmitter in response to detection of vibration from the vibration sensor.

8. The sensor apparatus of claim 4 wherein the wireless transmitter may be enabled by the processor, the processor enabling the wireless transmitter in response to detection of vibration from the vibration sensor.

9. The sensor apparatus of claim 1 further comprising a rotational sensor mounted on the concrete truck drum and coupled to the wireless transmitter.

10. The sensor apparatus of claim 9 wherein the rotational sensor mounted on the concrete truck drum is an accelerometer, and the apparatus further comprises a wireless receiver mounted on the truck for capturing signals transmitted from the accelerometer, the wireless receiver being communicative with a second processor configured for calculating current slump of the concrete in the mixing drum based on rotational speed of the mixing drum.

11. The sensor apparatus of claim 10 further comprising a hydraulic sensor coupled to the motor or hydraulic drive of the concrete delivery mixing truck.

12. The sensor apparatus of claim 9 further comprising a second processor connected to the temperature sensor and rotational sensor for calculating current slump of concrete in the mixing drum based on inputs from the temperature sensor and rotational sensor mounted on the concrete truck drum.

13. The sensor apparatus of claim 12 wherein the second processor is further configured to calculate when and how much of one or both of water and chemical additive is added into the concrete in the mixer drum.

14. The sensor apparatus of claim 1 wherein the temperature sensor is located on a mixer drum access door.

15. The sensor apparatus of claim 1 wherein the processor, temperature sensor, transmitter, and vibration sensor being powered by battery.

16. A wireless temperature sensor apparatus for measuring and transmitting temperature readings of concrete contained in a mixer drum mounted on a concrete delivery mixing truck, comprising:
    a processor mounted on the truck configured to receive signals from a temperature sensor via a wireless transmitter, and receive signals from an accelerometer, the signals relating to a concrete load mixed in the concrete delivery mixing truck drum;
    a temperature sensor mounted to the mixer drum on the truck, the mixer drum-mounted temperature sensor being effective to measure temperature of the concrete load within the truck-mounted concrete mixer drum;
    a wireless transmitter mounted to the mixer drum on the truck and communicative with the processor and temperature sensor, the wireless transmitter being effective for transmitting to the processor a signal corresponding to the temperature of the concrete in the mixer drum as detected by the temperature sensor;
    the accelerometer coupled to the drum or truck to detect vibration caused by motion of the drum, and communicative with the processor, the processor determining a rotational speed and direction of the concrete mixer drum using data from the accelerometer;
    the processor periodically receiving motion signals from the accelerometer, and, during periods of detected motion, obtaining a temperature reading from the temperature sensor and causing the transmitter to transmit the temperature reading, and in the absence of detected vibration, the processor entering a power consumption mode to conserve energy.

17. The sensor apparatus of claim 16 wherein the processor, transmitter, temperature sensor and accelerometer are mounted on a concrete mixer drum access door.

18. The sensor apparatus of claim 17 further comprising a second processor coupled to valves controlling water and chemical additive supply to the drum.

19. The sensor apparatus of claim 18 wherein the second processor is configured to calculate when and how much one or both of water and chemical additive is added into the concrete in the mixer drum and to control addition of one or both of water and chemical additive.

* * * * *